US012790224B2

(12) United States Patent
Jeon et al.

(10) Patent No.: US 12,790,224 B2
(45) Date of Patent: Nov. 10, 2026

(54) AEROGEL BLANKET

(71) Applicant: LG CHEM, LTD., Seoul (KR)

(72) Inventors: Hyun Woo Jeon, Daejeon (KR); Se Won Baek, Daejeon (KR); Kyu Reon Lee, Daejeon (KR); Mi Ri Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 630 days.

(21) Appl. No.: 17/427,018

(22) PCT Filed: Sep. 28, 2020

(86) PCT No.: PCT/KR2020/013283

§ 371 (c)(1),
(2) Date: Jul. 29, 2021

(87) PCT Pub. No.: WO2021/066492

PCT Pub. Date: Apr. 8, 2021

(65) Prior Publication Data

US 2022/0250922 A1 Aug. 11, 2022

(30) Foreign Application Priority Data

Sep. 30, 2019 (KR) ........................ 10-2019-0121123

(51) Int. Cl.
*C01B 33/158* (2006.01)
*B01J 13/00* (2006.01)
(Continued)

(52) U.S. Cl.
CPC .......... *C01B 33/159* (2013.01); *C01B 33/145* (2013.01); *C01B 33/1585* (2013.01);
(Continued)

(58) Field of Classification Search
CPC . C01B 33/159; C01B 33/145; C01B 33/1585; C01B 33/155; F16L 59/026;
(Continued)

(56) References Cited

U.S. PATENT DOCUMENTS 5,242,647 A 9/1993 Poco
5,275,796 A 1/1994 Tillotson et al.
(Continued)

FOREIGN PATENT DOCUMENTS

CN 107709235 A 2/2018
CN 107849764 A 3/2018
(Continued)

OTHER PUBLICATIONS

Rao et al (Organic Surface Modification of TEOS Based Silica Aerogels Synthesized by Co-Precursor and Derivatization Methods,,, Journal of Sol-Gel Science and Technology, 2004) (Year: 2004).*
(Continued)

*Primary Examiner* — Anthony J Zimmer
*Assistant Examiner* — Logan LaClair
(74) *Attorney, Agent, or Firm* — Morgan, Lewis & Bockius LLP

(57) ABSTRACT

The present invention relates to an aerogel blanket including an aerogel structure and a substrate for a blanket, wherein the aerogel structure includes a three-dimensional network structure formed by a plurality of aerogel particles aggregated or bonded, and an average aerogel structure size ($D_{50}$) measured by spraying 10 ml of dry powder of the aerogel structure with air at a pressure of 15 psi, and using laser diffraction of 780 nm wavelength is 5 μm to 10 μm.

16 Claims, 2 Drawing Sheets

(51) Int. Cl.
*C01B 33/145* (2006.01)
*C01B 33/159* (2006.01)
*F16L 59/02* (2006.01)

(52) U.S. Cl.
CPC ........... *F16L 59/026* (2013.01); *F16L 59/028* (2013.01); *C01P 2004/03* (2013.01); *C01P 2004/61* (2013.01); *C01P 2006/32* (2013.01)

(58) Field of Classification Search
CPC . F16L 59/028; C01P 2004/03; C01P 2004/61; C01P 2006/32; Y02E 60/13; C04B 2201/32; C04B 2201/50; C04B 30/02
See application file for complete search history.

(56) References Cited

U.S. PATENT DOCUMENTS

| | | | |
|---|---|---|---|
| 5,409,683 | A | 4/1995 | Tillotson et al. |
| 5,830,387 | A | 11/1998 | Yokogawa et al. |
| 2001/0034375 | A1 | 10/2001 | Schwertfeger et al. |
| 2016/0046495 | A1 | 2/2016 | Xiang |
| 2018/0009969 | A1* | 1/2018 | Kim .................... C01B 33/1585 |
| 2018/0010726 | A1 | 1/2018 | Kim et al. |
| 2018/0029892 | A1 | 2/2018 | Yu et al. |
| 2018/0127277 | A1 | 5/2018 | Kim et al. |
| 2018/0134566 | A1 | 5/2018 | Kim et al. |
| 2018/0312407 | A1 | 11/2018 | Oh et al. |
| 2018/0313001 | A1 | 11/2018 | Dempsey |
| 2018/0319669 | A1 | 11/2018 | Oh et al. |
| 2019/0002356 | A1 | 1/2019 | Hebalkar |
| 2019/0010060 | A1 | 1/2019 | Oh et al. |
| 2019/0119494 | A1 | 4/2019 | Makino et al. |
| 2019/0152788 | A1 | 5/2019 | Xiang |
| 2019/0276322 | A1 | 9/2019 | Kim et al. |
| 2020/0048100 | A1 | 2/2020 | Yu et al. |
| 2020/0255295 | A1 | 8/2020 | Kim et al. |

FOREIGN PATENT DOCUMENTS

| | | | |
|---|---|---|---|
| CN | 108290744 | A | 7/2018 |
| CN | 108290745 | A | 7/2018 |
| EP | 3281968 | A1 | 2/2018 |
| EP | 3357927 | A1 | 8/2018 |
| EP | 3305726 | A1 | 11/2018 |
| JP | 2012-144428 | A | 8/2012 |
| JP | 2015-67691 | A | 4/2015 |
| KR | 10-2007-0114668 | A | 12/2007 |
| KR | 10-0840603 | B1 | 6/2008 |
| KR | 10-1147494 | B1 | 5/2012 |
| KR | 10-1498562 | B1 | 3/2015 |
| KR | 10-2017-0031011 | A | 3/2017 |
| KR | 10-2018-0018401 | A | 2/2018 |
| KR | 10-2018-0029235 | A | 3/2018 |
| KR | 10-1868682 | B1 | 6/2018 |
| KR | 10-2018-0124663 | A | 11/2018 |
| KR | 10-2018-0132723 | A | 12/2018 |
| KR | 10-2019-0008007 | A | 1/2019 |
| KR | 10-2019-0098728 | A | 8/2019 |
| KR | 10-2020-0023516 | A | 3/2020 |
| WO | 2016-167494 | A1 | 10/2016 |
| WO | WO-2017145359 | A1 * | 8/2017 |

OTHER PUBLICATIONS

Machine translation of WO2017145359A1 (Year: 2017).*

ISO 13320-1 (1999) (Year: 1999).*

Extended European Search Report, dated Jan. 18, 2022, issued in EP Application No. 20870557.4.

Office Action issued in corresponding Korean Patent Application No. 10-2020-0126123, dated Mar. 5, 2023.

Ximeng, Jiang, "China Strategic Emerging Industries—New Materials—New Solar Energy materials", published by China Railway Publishing House on Dec. 2017.

MA Jia et al., "Preparation and Low-temperature Properties of Fiber Reinforced SiO2 Aerogel Composites", Materials Review, 2015, vol. 29, No. 10, pp. 43-46 and 63.

Office Action dated Apr. 26, 2022, issued in corresponding Chinese Patent Application No. 202080012558.5.

International Search Report and Written Opinion dated Jan. 15, 2021, issued in corresponding International Patent Application No. PCT/KR2020/013283.

* cited by examiner

AEROGEL BLANKET

CROSS-REFERENCE TO RELATED APPLICATIONS

This application claims the benefit of Korean Patent Application No. 10-2019-0121123, filed on Sep. 30, 2019, in the Korean Intellectual Property Office, the disclosure of which is incorporated by reference herein in its entirety.

TECHNICAL FIELD

The present invention relates to an aerogel blanket with increased flexibility by lowering the flexural modulus thereof.

BACKGROUND ART

An aerogel is a superporous, high specific surface area (≥500 $m^2/g$) material having a porosity of about 90-99.9% and a pore size in the range of 1-100 nm, and is a material having excellent properties of ultra-light weight, super thermal insulation, ultra-low dielectric, and the like. Accordingly, research on the development of aerogel materials as well as research on the practical use thereof as environmentally friendly high-temperature thermal insulation materials, ultra-low dielectric thin films for highly-integrated devices, catalysts and catalyst carriers, electrodes for supercapacitors, and electrode materials for seawater desalination have been actively conducted.

The biggest advantages of the aerogel are that the aerogel has super-insulation properties exhibiting a thermal conductivity of 0.300 W/mK or less, which is lower than that of a conventional organic thermal insulation material such as Styrofoam, and that fire vulnerability and the generation of harmful gases in case of occurrence of fire which are fatal weaknesses of the organic thermal insulation material can be solved.

In general, the aerogel is manufactured by preparing a hydrogel from a silica precursor such as water glass and an alkoxysilane group (TEOS, TMOS, MTMS, and the like) and removing a liquid component inside the hydrogel without destroying a microstructure.

Particularly, a hydrophobic silica aerogel blanket in which a hydrophobic silica aerogel is formed in a fiber is a functional thermal insulation material which prevents corrosion by moisture, and is widely used in construction or industrial fields. In general, such a hydrophobic silica aerogel blanket is manufactured through steps of silica sol solution preparation, gelation, aging, surface modification, and drying.

However, the surface modification step of the typical manufacturing method as described above uses a large amount of an organic solvent and an expensive surface modifier, and the process thereof is complex and long, so that economic feasibility and productivity are not good. In addition, ammonia generated when the surface of the silica aerogel is modified by the surface modifier reacts with carbon dioxide used in a supercritical drying step and forms ammonium carbonate salt, thereby causing problems such as blocking the piping of supercritical drying equipment, and the like, resulting in inhibiting the efficiency of a process. In addition, since there is a large amount of ammonia remaining in waste liquid generated after drying, it is impossible to recycle the waste liquid immediately, and there are problems in that a long purification process is required and purification cost increases in order to recycle the waste liquid.

In addition, as for an aging step which is a step for reinforcing the structure of an aerogel, since a structure reinforcing effect can be achieved when wet aging is performed in the presence of a base catalyst solution such as ammonia/ethanol, residual ammonia generated according to the performance of wet aging creates the same problem as a problem caused by surface modification when drying and reusing waste liquid, and there is a problem of cost increase due to additional use of a solvent. In addition, since a wet aging step and a surface modification step are performed separately, the process is cumbersome.

In addition, a silica aerogel blanket is manufactured in the form of a roll, and in actual application, the silica aerogel blanket is fixed in the state of being wound according to a desired form to obtain a thermal insulation effect, and thus, flexibility is an important indicator related to processability. However, there is a problem with a silica aerogel blanket manufactured by typical manufacturing methods as described above in that the flexural modulus thereof, which is related to flexibility, is difficult to be adjusted. In addition, mechanical physical properties such as tensile strength and flexibility are in a trade-off relationship with each other, so that there is a problem in that the processibility of a silica aerogel blanket having high tensile strength decreases as the flexibility thereof decreases.

(Patent Document 1) KR10-1147494B1

DISCLOSURE OF THE INVENTION

Technical Problem

An aspect of the present invention provides an aerogel blanket with increased flexibility by lowering the flexural modulus thereof while maintaining the mechanical physical properties, thermal insulation, and durability of the aerogel blanket.

Technical Solution

According to an aspect of the present invention, there is provided an aerogel blanket including an aerogel structure and a substrate for a blanket, wherein the aerogel structure includes a three-dimensional network structure formed by a plurality of aerogel particles aggregated or bonded, and an average aerogel structure size ($D_{50}$) measured by spraying 10 ml of dry powder of the aerogel structure with air at a pressure of 15 psi, and using laser diffraction of 780 nm wavelength is 5 μm to 10 μm.

Advantageous Effects

An aerogel blanket according to the present invention is capable of improving processability and workability by having excellent flexibility due to a low flexural modulus thereof, while having excellent mechanical physical properties, thermal insulation, and durability.

BRIEF DESCRIPTION OF THE DRAWINGS

The following drawings attached herein illustrate preferred embodiments of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
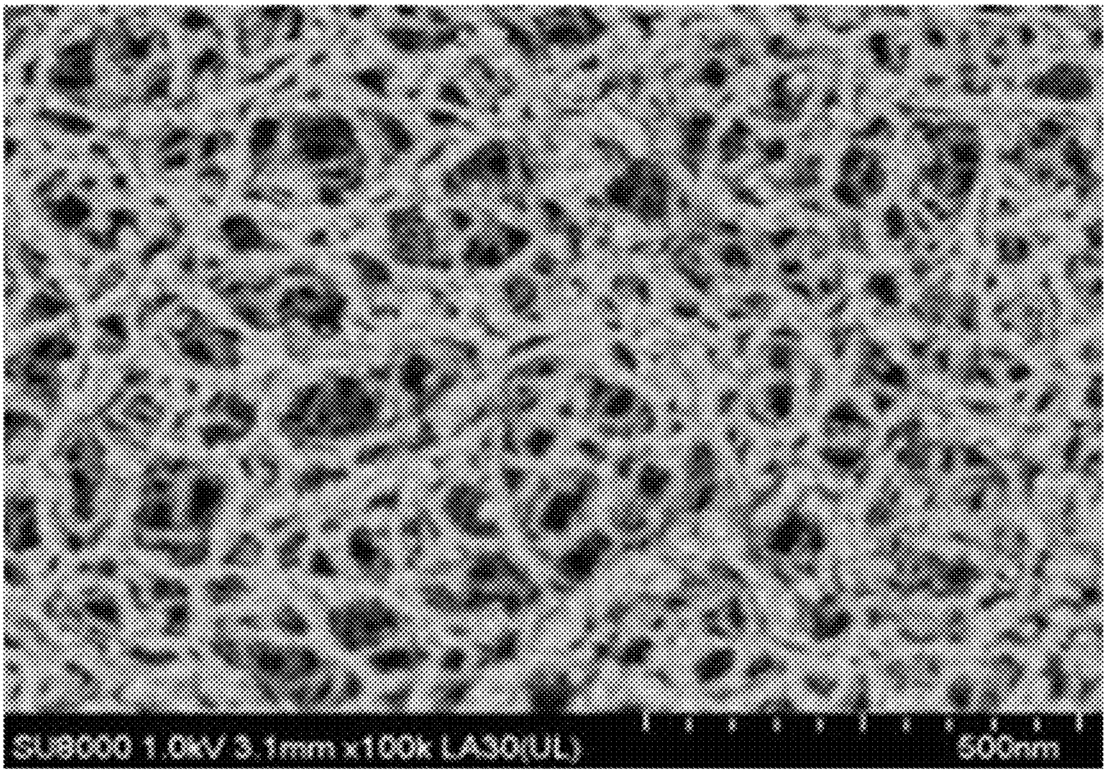
FIG. 1 is a photograph taken by a scanning electron microscope (SEM) of the cross-section of a silica aerogel blanket manufactured in Example 1 of the present invention.

Hereinafter, the present invention will be described in more detail to facilitate understanding of the present invention.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

"Average aerogel structure size ($D_{50}$)" defined in the present invention means the average size of an aerogel structure formed on a substrate for a blanket of an aerogel blanket, and as a specific example, it means the size of an aerogel structure itself which includes a three-dimensional network structure formed by a plurality of aerogel particles aggregated or bonded. Here, the average aerogel structure size does not mean the average particle diameter ($D_{50}$) of aerogel particles themselves or the average size of pores formed in an aerogel structure.

In addition, the "average aerogel structure size ($D_{50}$)" may mean a value measured by spraying 10 ml of dry powder of an aerogel structure formed on a substrate for a blanket of an aerogel blanket into a particle size analyzer S3500 of Microtrac Co., Ltd with air at a pressure of 15 psi, and using laser diffraction of 780 nm wavelength.

As described above, a hydrophobic silica aerogel blanket in which a hydrophobic silica aerogel is formed in a fiber is a functional thermal insulation material which prevents corrosion by moisture, and is widely used in construction or industrial fields. Accordingly, the silica aerogel blanket is required to have excellent thermal insulation as well as water repellency to prevent the penetration of moisture into the aerogel in order to maintain the thermal insulation. In order to impart water repellency, a surface modification step of modifying the surface of the aerogel to be hydrophobic is performed to suppress the penetration of moisture into the aerogel blanket when manufacturing the aerogel blanket, and by the surface modification step, a hydrophobic group is introduced on the outermost surface of the aerogel to secure short-term water repellency.

However, when a surface modification reaction is performed by the surface modification step, the preceding gelation step is not affected by a surface modifier, so that aerogel structures formed by gelation are tangles and form one large structure. Therefore, an aerogel structure formed on the substrate for a blanket of the aerogel blanket is shaped like one plate (see FIG. 2), and accordingly, the average aerogel structure size ($D_{50}$) is increased, so that there is a problem in that the flexural modulus of the aerogel blanket is increased, thereby degrading flexibility.

On the other hand, unlike typical methods, a method for manufacturing an aerogel blanket according to the present invention performs a gelation step and a surface modification step simultaneously as to be described below, so that the gelation step and the surface modification step affect each other. Particularly, according to the method for manufacturing an aerogel blanket of the present invention, when an aerogel structure is formed by a gelation step, the concentration of a surface modifier affects the formation of the aerogel structure, so that aerogel structures are not tangled with each other to allow the formation of a smaller structure form.

Therefore, an aerogel blanket of the present invention manufactured according to the method for manufacturing an aerogel blanket of the present invention has an aerogel structure in a spider web shape, not in a plate shape (see FIG. 1), formed on a substrate for a blanket of the aerogel blanket, and accordingly, the average aerogel structure size ($D_{50}$) is decreased, so that the flexural modulus of the aerogel blanket is decreased, thereby increasing flexibility.

The aerogel blanket according to the present invention includes an aerogel structure and a substrate for a blanket, wherein the aerogel structure includes a three-dimensional network structure formed by a plurality of aerogel particles aggregated or bonded, and an average aerogel structure size ($D_{50}$) measured by spraying 10 ml of dry powder of the aerogel structure with air at a pressure of 15 psi, and using laser diffraction of 780 nm wavelength is 5 μm to 10 μm.

According to an embodiment of the present invention, the aerogel blanket is manufactured by the method for manufacturing an aerogel blanket to be described below, and may include an aerogel structure and a substrate for a blanket by forming the aerogel structure on the substrate for a blanket.

According to an embodiment of the present invention, the aerogel structure may include a three-dimensional network structure formed by a plurality of aerogel particles aggregated or bonded, the particles formed when gelation and surface modification were simultaneously performed from a silica sol including a silica precursor composition and a catalyst composition when manufacturing an aerogel blanket. As a specific example, the aerogel structure is affected by a hydrophobizing agent during a gelation reaction, so that the reaction is terminated before the size of the aerogel structure increases, or the growth of the aerogel structure is inhibited, so that an aerogel structure in the shape of a spider web entangled like a skein may be prepared. On the other hand, unlike the present invention, when a gelation reaction is performed from a silica precursor and a surface modification step is separately performed, the aerogel structure is not affected by a hydrophobizing agent during the gelation reaction, and thus, aerogel structures are tangled together to form an aerogel structure in the shape of one large plate. Therefore, the aerogel structure has a structure in a different form from the aerogel structure of the present invention.

According to an embodiment of the present invention, the average aerogel structure size ($D_{50}$) does not mean the average particle diameter ($D_{50}$) of a plurality of aerogel particles forming an aerogel structure or the average size of pores formed in the aerogel structure, but represents the average size of aerogel structures of a spider web shape having a three-dimensional network structure formed by a plurality of aerogel particles aggregated or bonded by being manufactured by the method for manufacturing an aerogel blanket to be described below.

According to an embodiment of the present invention, the average aerogel structure size ($D_{50}$) may be 5 μm to 10 μm, 5 μm to 8 μm, or 6 μm to 7 μm. When in the above range, processability and workability may be improved since an aerogel blanket has excellent flexibility of due to a low flexural modulus thereof, while having excellent mechanical physical properties, thermal insulation, and durability.

The average aerogel structure size ($D_{50}$) according to the present invention may be achieved by the method for manufacturing an aerogel blanket to be described below. As described above, the aerogel structure is affected by a hydrophobizing agent during a gelation reaction, so that the reaction is terminated before the size of the aerogel structure increases, or the growth of the aerogel structure is inhibited, and thus, the aerogel structure may have a shape of a spider web entangled like a skein, and accordingly, the average aerogel structure size may be adjusted to be within the above range. That is, in order to satisfy the above average aerogel structure size ($D_{50}$), it is important that a hydrophobizing agent affects a gelation reaction as in the method for manufacturing an aerogel blanket according to the present invention.

On the other hand, unlike the present invention, when a gelation reaction is performed on a silica precursor and a surface modification step is separately performed, or even when a silica precursor composition includes a hydrophobizing agent, the hydrophobizing agent is not activated during the gelation reaction but activated during high-temperature wet aging, the hydrophobizing agent does not affect the gelation reaction, and thus, aerogel structures are tangled together to form an aerogel structure in the shape of one large plate. In this case, the size of the aerogel structure itself is bound to increase, so that an average aerogel structure size ($D_{50}$) becomes in the range of 15 μm to 20 μm, which is far above the size limited in the present invention, and since the average aerogel structure size increases, a flexural modulus increases, so that flexibility is degraded, and accordingly, processability and workability may be degraded.

According to an embodiment of the present invention, the aerogel blanket includes an aerogel and a substrate for a blanket, wherein an aerogel structure may be formed inside and on the surface of the substrate for a blanket. As a specific example, the aerogel blanket may have a large amount of aerogel structures evenly formed inside and on the surface of a substrate for a blanket. As a more specific example, the aerogel blanket is manufactured by a method for manufacturing an aerogel blanket to be described, wherein a substrate for a blanket is impregnated with a silica sol to form an aerogel structure. As described above, the aerogel blanket is manufactured by forming an aerogel structure from a silica sol impregnated into the inside of a substrate for a blanket and a silica sol present on the surface thereof, so that the aerogel structure may be formed inside the substrate for a blanket impregnated with the silica sol and on the surface of the substrate for a blanket having the silica sol present on the surface thereof.

According to an embodiment of the present invention, the aerogel particles may include a hydrophobic group on the surface of the inside of the aerogel particles. As a specific example, the aerogel may have a hydrophobic group uniformly introduced both on the outermost surface of the aerogel and on the surface of the inside of the aerogel, which may be implemented by a method for manufacturing an aerogel blanket according to the present invention to be described below. As a more specific example, the aerogel blanket is manufactured by a method for manufacturing an aerogel blanket to be described, wherein a substrate for a blanket is impregnated with a silica sol, and then subjected to gelation, aging, and surface modification simultaneously through a step of leaving, so that an aerogel particle and an aerogel structure are simultaneously formed. Therefore, a hydrophobic group derived from a hydrophobizing agent may be evenly introduced into the inside of the aerogel particle. Therefore, the aerogel particle according to the present invention may include a hydrophobic group not only on the surface of the outside of the aerogel particle but also on the surface of the inside of the aerogel particle, in which case there is an effect of further increasing thermal insulation by increasing the water repellency of an aerogel blanket.

According to an embodiment of the present invention, the aerogel blanket may have a flexural modulus of 0.08 MPa or less, 0.07 MPa or less, or 0.065 MPa or less at 15% strain measured in accordance with ASTM D790. In addition, the aerogel blanket may have a flexural modulus of 0.01 MPa or greater, 0.02 MPa or greater, or 0.023 MPa or greater at 15% strain measured in accordance with ASTM D790. Here, a test in accordance with ASTM D790 may be measured by manufacturing preparing an aerogel blanket as a specimen according to the ASTM D790 standard. As a specific example, the specimen according to the ASTM D790 standard may be prepared to have a length of 127 mm, a width of 12.7 mm, and a thickness of 8 mm to 12 mm. The flexural modulus may be achieved by satisfying the average aerogel structure size ($D_{50}$) of an aerogel structure including in an aerogel blanket. When an aerogel blanket is subjected to bending, if an aerogel structure formed inside and on the surface of a substrate for a blanket is large in size and has a plate shape, resistance to the bending is bound to increase, so that a flexural modulus is bound to increase. On the other hand, the size of an aerogel structure prepared according to the present invention may be adjusted and the aerogel structure has a spider web shape, so that it is possible to adjust a flexural modulus by decreasing resistance to bending, and when an aerogel blanket satisfies the flexural modulus, the flexibility thereof is excellent, so that there is an effect of improving processability and workability.

According to an embodiment of the present invention, the aerogel blanket has a compression strength of 30 kPa to 50 kPa, 30 kPa to 45 kPa, or 35 kPa to 40 kPa at 10% strain measured in accordance with ASTM C165. Here, a test in accordance with ASTM C165 may be measured by manufacturing preparing an aerogel blanket as a specimen according to the ASTM C165 standard. As a specific example, the specimen according to the ASTM C165 standard may be prepared to have a length of 127 mm, a width of 12.7 mm, and a thickness of 8 mm to 12 mm. When an aerogel blanket satisfies the above compression strength, the robustness thereof is maintained, so that there is an effect in that the mechanical physical properties of the aerogel blanket are excellent.

According to an embodiment of the present invention, the aerogel blanket may have a tensile strength of 40 $N/cm^2$ to 60 $N/cm^2$, 40 $N/cm^2$ to 55 $N/cm^2$, or 44 $N/cm^2$ to 53 $N/cm^2$ measured in accordance with ASTM D638. Here, a test in accordance with ASTM D638 may be measured by manufacturing preparing an aerogel blanket as a specimen according to the ASTM D638 standard. As a specific example, the specimen according to the ASTM D638 standard may be prepared to have a length of 150 mm or greater, a width of 1.5 mm to 2.5 mm, and a thickness of 8 mm to 12 mm; a length of 115 mm or greater, a width of 1.5 mm to 3.5 mm, a thickness of 8 mm to 12 mm; or a length of 246 mm, a width of 29 mm, and a thickness of 8 mm to 12 mm. When an aerogel blanket satisfies the above tensile strength, there is an effect of maintaining the balance between the mechanical physical properties of the aerogel blanket and the flexibility thereof.

According to an embodiment of the present invention, the aerogel blanket may have a room temperature (23±5° C.) thermal conductivity of 30.0 mW/mK or less. The room temperature thermal conductivity is to represent the thermal insulation of an aerogel blanket. When the room temperature thermal conductivity thereof is maximum 30.0 mW/mK or less, and when the aerogel blanket is used as a thermal insulation material, there is an effect of securing sufficient thermal insulation. In addition, the aerogel blanket may have a room temperature (23±5° C.) thermal conductivity of 25.0 mW/mK or less, or 20.0 mW/mK or less. When in the above range, there is an effect of securing the thermal insulation of an aerogel blanket to the maximum.

According to an embodiment of the present invention, the aerogel blanket may have a moisture impregnation rate of 15 minutes of 20.0 wt % or less, 10.0 wt % or less, 5.0 wt % or less, 3.0 wt % or less, or 2.5 wt % or less, which is calculated by Equation 1 below. When in the above range, the water repellency of the aerogel blanket is excellent, so that durability may be improved, and accordingly, there is an effect of preventing the degradation in thermal insulation.

Moisture impregnation rate of 15 minutes (wt %)={(Aerogel blanket weight after impregnation in distilled water of 21±2° C. for 15 minutes−Aerogel blanket weight before impregnation in distilled water)/Aerogel blanket weight before impregnation in distilled water}×100 [Equation 1]

According to an embodiment of the present invention, the aerogel blanket may be usefully used as a thermal insulation material or a non-combustible material for aircrafts, ships, automobiles, building structures, and the like, as well as for plant facilities for insulating and cooling, such as piping and industrial furnaces of various industrial facilities.

Method for Manufacturing Aerogel Blanket

The present invention provides a method for manufacturing an aerogel blanket to manufacture the above aerogel blanket.

In order to manufacture the aerogel blanket according to the present invention, it is necessary to include a manufacturing step of uniformly introducing a hydrophobic group both on the outermost surface of an aerogel and on the surface of the inside of the aerogel.

The method for manufacturing an aerogel blanket according to the present invention includes 1) preparing a silica sol, 2) impregnating the silica sol into a substrate for a blanket, and 3) leaving the silica sol-substrate for a blanket composite to stand, wherein the silica sol includes a silica precursor composition and a catalyst composition, and the catalyst composition includes a hydrophobizing agent, a base catalyst, water, and an organic solvent, wherein the base catalyst may be included in an amount of 0.4 parts by weight to 1.0 part by weight based on 100 parts by weight of the silica sol.

According to an embodiment of the present invention, the silica sol may be a precursor which may eventually prepare a silica aerogel through a gelation reaction, or may be prepared by mixing a silica precursor composition and a catalyst composition.

According to an embodiment of the present invention, the silica precursor composition may include a silica precursor, an organic solvent, and water. At this time, the silica precursor included in the silica precursor composition is a material for allowing a prepared aerogel to contain silica. As an example, one or more selected from the group consisting of tetra methyl ortho silicate (TMOS), tetra ethyl ortho silicate (TEOS), methyl triethyl ortho silicate, dimethyl diethyl ortho silicate, tetra propyl ortho silicate, tetra isopropyl ortho silicate, tetra butyl ortho silicate, tetra secondarybutyl ortho silicate, tetra tertiarybutyl ortho silicate, tetra hexyl ortho silicate, tetra cyclohexyl ortho silicate, and tetra dodecyl ortho silicate may be used, or a pre-hydrolysate of thereof may be used. When a pre-hydrolysate is used, the addition of an acid is not required, a process of hydrolyzing a silica precursor may be shortened or omitted, and an effect of surface modification may be promoted. More specifically, in the present invention, as the silica precursor (HTEOS), a pre-hydrolyzed polyethyl silicate may be used.

Here, the HTEOS is a pre-hydrolyzed ethyl polysilicate oligomer material having a wide molecular weight distribution, and when synthesized into an oligomer form from a TEOS monomer by varying the degree of prehydrolysis (the degree of hydration), physical properties such as gelation time may be adjusted, and thus, may be easily applied according to user's reaction conditions. In addition, there is an advantage in that reproducible physical properties of a final product may be created.

According to an embodiment of the present invention, the silica precursor may be used in an amount such that the content of silica contained in the silica sol becomes 0.1 wt % to 30 wt %, but the amount of the silica precursor to be used is not limited thereto. When the content of silica satisfies the above range, it is preferable in terms of obtaining mechanical physical properties of an aerogel blanket, the flexibility thereof in particular, to an excellent level and also having an improved thermal insulation effect.

According to an embodiment of the present invention, the organic solvent may specifically be an alcohol, and at this time, the alcohol may be a monohydric alcohol such as methanol, ethanol, isopropanol, and butanol; or a polyhydric alcohol such as glycerol, ethylene glycol, propylene glycol, diethylene glycol, dipropylene glycol, and sorbitol, and any one thereof or a mixture of two or more thereof may be used. Among the above, when considering the miscibility with water and an aerogel, the alcohol may be a monohydric alcohol having 1-6 carbon atoms such as methanol, ethanol, isopropanol, and butanol, and may be, for example, ethanol. The alcohol (an organic solvent) as described above and water may be used in an appropriate amount by those skilled in the art in consideration of the degree of hydrophobicity in an aerogel to be finally prepared while promoting a surface modification reaction.

According to an embodiment of the present invention, the catalyst composition is characterized by including a hydrophobizing agent, a base catalyst, water, and an organic solvent, wherein the base catalyst is included in an amount of 0.4 parts by weight to 1.0 part by weight based on 100 parts by weight of the silica sol.

According to an embodiment of the present invention, the catalyst composition includes water together with a hydrophobizing agent in the composition, and thus, may activate the hydrophobizing agent included in the catalyst composition, and as the hydrophobizing agent is activated, aging and surface modification may be performed without using an aging solution and a surface modification solution, separately. Here, the activation of a hydrophobizing agent may mean that a functional group of the hydrophobizing agent other than an alkyl group, such as an alkoxy group, a halogen group, and the like are subjected to a hydrolysis reaction, thereby forming a hydroxyl group (—OH) at the position of the functional group. When the hydrophobizing agent is activated, reactivity with an —Si—O— functional group forming a network structure in a silica wet gel may be greatly increased, so that the hydrophobizing agent and the silica wet gel may react with each other without a separate additional catalyst and a solvent to achieve structure enhancement or surface modification. In addition, there is an effect of improving the long-term water repellency of the aerogel blanket, accordingly.

According to an embodiment of the present invention, when the catalyst composition includes a hydrophobizing agent but not water, the hydrophobizing agent cannot be activated. Therefore, in order to achieve aging and surface modification afterwards, aging and surface modification processes which require a large amount of solvent should be performed under high temperature conditions as in a typical method, and there may be a problem in which aging and surface modification reactions do not occur even if left to stand under room temperature conditions. Accordingly, structure enhancement is not achieved, so that shrinkage of a gel structure may occur during drying, and since there is no surface modification reaction, there may be a problem in that a hydrophobic silica aerogel blanket is not manufactured.

According to an embodiment of the present invention, an alkyl silane compound may be used as the hydrophobizing agent, in which case the hydrophobizing agent may participate in a gelation reaction as a co-precursor, and may hydrophobize a formed silica wet gel blanket. Since an alkyl silane compound may be gelled with a silica precursor in a gelation step, or an alkyl silane compound trapped in a gel may be subjected to aging or surface modification in a step of leaving and form an alkyl-Si—O—Si network to hydrophobize a silica wet gel blanket, a surface modification step may be omitted when manufacturing a hydrophobic silica aerogel blanket. As a result, the amount of an organic solvent and a surface modifier to be used in a surface modification step may be reduced, and process time and manufacturing cost may be reduced. In addition, the amount of ammonia generated when the surface of a silica wet gel is surface-modified may be greatly reduced, so that the reuse efficiency of waste liquid generated after manufacturing the silica aerogel blanket may be increased, and when reusing the waste liquid, a hydrophobizing agent component included in the waste liquid may be included in a silica sol again, so that the amount of a hydrophobizing agent to be used may also be greatly reduced by the reuse.

Here, a hydrophobizing agent may specifically be an alkyl silane compound as described above, and as long as it is an alkyl silane compound containing an alkyl group inducing hydrophobization and a silane functional group capable of reacting with an —Si—O-functional group of a wet gel, the type thereof is not limited. More specifically, the hydrophobizing agent may include one more selected from the group consisting of trimethylethoxysilane (TMES), trimethylsilanol (TMS), trimethylchlorosilane (TMCS), methyltrimethoxysilane (MTMS), methyltriethoxysilane (MTES), dimethyldiethoxysilane (DMDEOS), ethyltriethoxysilane, and phenyltriethoxysilane.

According to an embodiment of the present invention, it may be more preferable that the hydrophobizing agent does not contain a silazane-based compound such as hexamethyldisilazane. When a silazane-based compound is included, the silazane-based compound may start to decompose when it comes into contact with an organic solvent and generate ammonia, so that as soon as the silazane-based compound is introduced into a catalyst composition including an organic solvent, a high pH may be formed due to the generation of ammonia, which may immediately start a gelation reaction. Therefore, in terms of preventing an unexpected gelation reaction and easily controlling gelation time by varying a catalyst amount, it is preferable not to include a silazane-based compound.

According to an embodiment of the present invention, the hydrophobizing agent may be included in an amount of 3 parts by weight to 15 parts by weight, specifically 3 parts by weight to 10 parts by weight, and more specifically 4.5 parts by weight to 7.5 parts by weight based on 100 parts by weight of a silica sol. When in the above range, hydrophobization efficiency (surface modification efficiency) compared to the amount used may be further improved.

According to an embodiment of the present invention, the catalyst composition may include 3 equivalents to 8 equivalents of water based on 1 equivalent of a hydrophobizing agent. Specifically, the water may be included in an amount of 4 equivalents to 8 equivalents, more preferably 5 equivalents to 6 equivalents based on 1 equivalent of a hydrophobizing agent. When the water is included in an amount of 3 equivalents or more based on 1 equivalent of a hydrophobizing agent, the hydrophobizing agent may be sufficiently activated, so that the structure enhancement and surface modification of a wet gel may be easily achieved without an additional catalyst, a surface modifier, and a solvent. Accordingly, it is preferable since even when wet aging and a separate surface modification process which require high-temperature temperature conditions and a large amount of an organic solvent and a surface modifier are not performed, a silica aerogel blanket having excellent hydrophobicity may be manufactured. In addition, when the water is included in an amount of 8 equivalents or less based on 1 equivalent of a hydrophobizing agent, the amount of water in a wet gel blanket may be controlled. Accordingly, water is effectively removed in a supercritical drying process to suppress the shrinkage of an aerogel due to the water, so that thermal conductivity and hydrophobicity may be further improved.

According to an embodiment of the present invention, the base catalyst may be included in an amount of 0.4 parts by weight to 1.0 part by weight, specifically 0.6 parts by weight to 1.0 parts by weight, and more specifically 0.6 parts by weight to 0.8 parts by weight based on 100 parts by weight of the entire silica sol. When a base catalyst is included in an amount of less than 0.4 parts by weight, in the process of leaving in Step 3), the reactivity between a hydrophobizing agent and the surface of a silica gel is weak, which may cause a problem in that surface modification is not achieved. When included in an amount of greater than 1.0 part by weight, there may be problems in that a gelation rate is too high, so that it may be difficult to prepare a uniform gel, and also, physical properties may be degraded due to the formation of the non-uniform gel.

According to an embodiment of the present invention, the base catalyst may be used without limitation as long as it is a material which may allow the formation of a pH condition for achieving gelation. For example, the basic catalyst may be an inorganic base such as sodium hydroxide and potassium hydroxide, or an organic base such as ammonium hydroxide.

Specifically, the organic base may be ammonium hydroxide ($NH_4OH$), tetramethylammonium hydroxide (TMAH, tetraethyl ammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethylamino) ethanol, 2-(methylamino) ethanol, N-methyldiethanolamine, dimethylaminoethanol, diethylaminoethanol, nitrilotriethanol, 2-(2-aminoethoxy)ethanol, 1-amino-2-propanol, triethanolamine, monopropanolamine, or dibutanol, and a mixture of two or more thereof may be used. More specifically, the base catalyst may be ammonium hydroxide (ammonia water; $NH_4OH$).

According to an embodiment of the present invention, the organic solvent is the same as described above, and the amount of the organic solvent to be used may be appropriately adjusted in consideration of compatibility with water and a wet gel, and ease of structure enhancement and surface modification.

According to an embodiment of the present invention, the catalyst composition may be included in an amount which allows the pH of a silica sol to be 4 to 8. When included in an amount which allows the pH of a silica sol to satisfy the above range, gelation may be easily and efficiently achieved. In addition, the catalyst composition is added in a liquid phase in which a base catalyst is diluted in water and an organic solvent, so that it is possible to prevent the problem in that the catalyst is precipitated.

According to an embodiment of the present invention, Step 1) is a step for preparing a silica sol, and may be performed by mixing a silica precursor composition and a catalyst composition. At this time, the silica sol, the silica precursor composition, and the catalyst composition are all the same as described above. In addition, the mixing of a silica precursor composition and a catalyst composition may be performed under the conditions of room temperature and atmospheric pressure.

According to an embodiment of the present invention, since the above-described silica sol is prepared in Step 1), even when a silica sol-substrate for a blanket composite are left to stand without an additional base catalyst, a surface modifier, and an organic solvent in Step 3), structure enhancement and surface modification may be achieved.

According to an embodiment of the present invention, Step 2) is a step for forming a silica sol-substrate for a blanket composite, and may be performed by impregnating the silica sol of Step 1) into a substrate for a blanket.

According to an embodiment of the present invention, the substrate for a blanket may specifically be a porous substrate in terms of improving the thermal insulation properties of a silica aerogel blanket. When a porous substrate for a blanket is used, a silica sol is allowed to easily penetrate into the substrate, and thus, forms an aerogel uniformly inside the substrate for a blanket, so that a silica aerogel blanket manufactured may have excellent thermal insulation properties.

According to an embodiment of the present invention, the substrate for a blanket may be a film, a sheet, a net, a fiber, a porous body, a foam, a non-woven body, or a laminate of two or more layers thereof. Also, according to the use of the substrate for a blanket, surface roughness may be formed or patterned on the surface thereof. Specifically, the substrate for a blanket may be a fiber capable of further improving thermal insulation performance by including a space or a void which allows an aerogel to be easily formed inside the blanket substrate, and may have low thermal conductivity.

According to an embodiment of the present invention, the substrate for a blanket may be polyamide, polybenzimidazole, polyaramide, an acryl resin, a phenol resin, polyester, polyetheretherketone (PEEK), polyolefin (polyethylene, polypropylene, or a copolymer thereof, and the like), cellulose, carbon, cotton, wool, hemp, a non-woven fabric, a glass fiber, or ceramic wool, and the like.

According to an embodiment of the present invention Step 3) is a step for leaving the silica sol-substrate for a blanket composite to stand, and gelation, aging, and surface modification may be performed in Step 3).

According to an embodiment of the present invention, since the silica sol of Step 1) described above is used, aging and surface modification may be easily achieved after gelation without using a separate surface modification solution and an aging solution (a base catalyst and a solvent). Since wet aging, and a surface modification process using a separate surface modification solution are not performed as described above, the amount of a solvent to be used and the amount of a surface modifier to be used may be greatly reduced compared to a typical silica aerogel blanket manufacturing process. In addition, since a base catalyst component included in the wet aging and the generation amount of ammonia generated from a surface modification reaction may be significantly lowered, the amount of ammonia in waste liquid generated after manufacturing an aerogel blanket is reduced, so that the reuse efficiency of the waste liquid may be increased. In addition, there is an effect of improving the long-term water repellency of the aerogel blanket, accordingly.

According to an embodiment of the present invention, Step 3) may be performed under room temperature condition, and under the above temperature condition, aging and surface modification may be more easily achieved. In addition, the room temperature may specifically indicate a temperature of 15° C. to 30° C., or 15° C. to 25° C. In addition, Step 3) may be performed for 5 to 48 hours, preferably 10 to 38 hours, and more preferably 15 to 24 hours.

According to an embodiment of the present invention, by adjusting the amount of a base catalyst in a catalyst composition, gelation time may be easily adjusted to manufacture a silica aerogel having intended physical properties. At this time, gelation time may preferably be adjusted to 1 to 25 minutes, specifically 5 minutes to 10 minutes.

According to an embodiment of the present invention, gelation may form a three-dimensional network structure from a precursor material, wherein the three-dimensional network structure may be a planar mesh structure in which specific polygons having one or more types of atomic arrangement are linked to each other, or a structure in which specific polyhedrons share their vertices, edges, faces, and the like with each other to form a three-dimensional skeleton structure.

According to an embodiment of the present invention, a drying step may be further included after Step 3), wherein a silica wet gel blanket is dried to prepare a hydrophobic silica aerogel.

According to an embodiment of the present invention, a washing step may be further performed before the drying. The washing is a step for removing impurities (sodium ions, unreacted substances, by-products, and the like) generated during the reaction and residual ammonia, which may generate an ammonium carbonate salt by reacting with $CO_2$ during supercritical drying, and the like in order to obtain a hydrophobic silica aerogel with high purity, and may be performed by a dilution process or an exchange process using a non-polar organic solvent.

According to an embodiment of the present invention, the drying step may be performed through a process for removing a solvent while maintaining the pore structure of an aged silica gel, and the drying step may be performed by supercritical drying. The supercritical drying process may be performed using supercritical carbon dioxide. Carbon dioxide ($CO_2$) is in a gaseous state at room temperature and atmospheric pressure. However, when a temperature and pressure exceed a predetermined temperature and pressure limit called a supercritical point, the evaporation process does not occur so that carbon dioxide becomes to be in a critical state in which gas and liquid cannot be distinguished. Carbon dioxide in a critical state is referred to a supercritical carbon dioxide. A supercritical carbon dioxide has a molecular density close to that of a liquid, however, has a low viscosity, thereby having properties close to those of gas. Therefore, a supercritical carbon dioxide has a high diffusion rate and a high thermal conductivity so that drying efficiency thereof is high, and drying process time may be shortened.

According to an embodiment of the present invention, the supercritical drying process performs a solvent substitution process in which an aged silica gel is placed into a supercritical drying reactor, $CO_2$ in a liquid state is filled therein, and an alcohol solvent inside a silica aerogel is substituted with $CO_2$. Thereafter, the temperature is raised to 40° C. to 80° C. at a predetermined temperature raising rate, specifically, 0.1° C./min to 1° C./min, and the pressure which is greater than a pressure at which carbon dioxide becomes to be a supercritical state, specifically, the pressure of 100 bar to 170 bar is maintained to allow the carbon dioxide to remain in the supercritical state for a predetermined amount of time, specifically for 20 minutes to hour. In general, carbon dioxide becomes to be in a supercritical state at a temperature of 31° C. and pressure of 73.8 bar. After carbon dioxide is maintained at a predetermined temperature and a predetermined pressure to remain in a supercritical state for 2 hours to 12 hours, more specifically, 2 hours to 6 hours, the pressure is generally lowered to complete the supercritical drying process to manufacture an aerogel blanket.

According to an embodiment of the present invention, as a result of the above drying process, a blanket including a porous silica aerogel having nano-sized pores and/or a blanket including a porous silica aerogel may be manufactured. The silica aerogel has excellent physical properties, low tap density and high porosity in particular, together with a high degree of hydrophobicity, and a silica aerogel-containing blanket including the same has excellent mechanical flexibility together with low thermal conductivity.

According to an embodiment of the present invention, before or after the drying process, a compression process to control the thickness and to make the internal structure and surface shape of a blanket uniform, a molding process to have a suitable shape or morphology according to use, or a lamination process for laminating a separate functional layer may be further performed.

EXAMPLES

Hereinafter, Examples of the present invention will be described in detail so that those skilled in the art may easily carry out the present invention. However, the present invention may be embodied in many different forms, and is not limited to Examples set forth herein.

Example 1

31.90 g of a pre-hydrolyzed TEOS (silica content=20 wt %, HTEOS), 31.35 g of ethanol, and 2.8 g of water were added to a reactor and mixed to prepare a silica precursor composition. In addition, 7.77 g of trimethylethoxysilane (TMES) as a hydrophobizing agent, 47.28 g of ethanol, 4.22 g of water, and as a base catalyst, 2.75 g of ammonia water (concentration: 30 wt %) were added to another reactor and mixed to prepare a catalyst composition. At this time, in the prepared catalyst composition, the total amount of the water was 5.2 equivalents based on 1 equivalent of TMES, and the amount of the base catalyst was 0.64 parts by weight based on 100 parts by weight of the entire sol. The silica precursor composition and the catalyst composition prepared were mixed to prepare a silica sol, and the silica sol was impregnated into a fiber (a glass fiber fiber mat, 10 mm) which is a substrate for a blanket. A fiber composite impregnated with the silica sol was left to stand at room temperature for 24 hours to be subjected to gelation, surface modification, and aging. A silica wet gel blanket manufactured was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, ethanol was recovered through a lower end of the extractor. Thereafter, $CO_2$ was vented over the course of 2 hours. After supercritical drying was completed, drying was performed for 1 hour under the conditions of 150° C. and atmospheric pressure to manufacture a silica aerogel blanket.

Examples 2

A silica aerogel blanket was manufactured in the same manner as in Example 1 except that when preparing a catalyst composition in Example 1, trimethylethoxysilane (TMES) was added as a hydrophobizing agent in a weight ratio of 0.8 (6.21 g) compared to Example 1.

Examples 3

A silica aerogel blanket was manufactured in the same manner as in Example 1 except that when preparing a catalyst composition in Example 1, trimethylethoxysilane (TMES) was added as a hydrophobizing agent in a weight ratio of 0.9 (6.99 g) compared to Example 1.

Examples 4

A silica aerogel blanket was manufactured in the same manner as in Example 1 except that when preparing a catalyst composition in Example 1, trimethylethoxysilane (TMES) was added as a hydrophobizing agent in a weight ratio of 1.1 (8.55 g) compared to Example 1.

Examples 5

A silica aerogel blanket was manufactured in the same manner as in Example 1 except that when preparing a catalyst composition in Example 1, trimethylethoxysilane (TMES) was added as a hydrophobizing agent in a weight ratio of 1.2 (9.32 g) compared to Example 1.

Comparative Example 1

31.90 g of a pre-hydrolyzed TEOS(HTEOS), 7.77 g of TMES as a hydrophobizing agent, 47.28 g of ethanol, and 2.8 g of water were added to a reactor and mixed to prepare a silica precursor composition. In addition, 47.28 g of ethanol, 4.22 g of water, and 2.75 g of ammonia water (concentration: 30 wt %) were added to another reactor and mixed to prepare a catalyst composition. A silica aerogel blanket was manufactured in the same manner as in Example 1 except that the silica precursor and the catalyst composition prepared above were used.

Comparative Example 2

A silica aerogel blanket was manufactured in the same manner as in Comparative Example 1 except that when preparing a silica precursor composition in Comparative Example 1, trimethylethoxysilane (TMES) was added as a hydrophobizing agent in a weight ratio of 0.8 (6.21 g) compared to Comparative Example 1.

Comparative Example 3

A silica aerogel blanket was manufactured in the same manner as in Comparative Example 1 except that when preparing a silica precursor composition in Comparative Example 1, trimethylethoxysilane (TMES) was added as a hydrophobizing agent in a weight ratio of 0.9 (6.99 g) compared to Comparative Example 1.

Comparative Example 4

A silica aerogel blanket was manufactured in the same manner as in Comparative Example 1 except that when preparing a silica precursor composition in Comparative Example 1, trimethylethoxysilane (TMES) was added as a hydrophobizing agent in a weight ratio of 1.1 (8.55 g) compared to Comparative Example 1.

Comparative Example 5

A silica aerogel blanket was manufactured in the same manner as in Comparative Example 1 except that when preparing a silica precursor composition in Comparative Example 1, trimethylethoxysilane (TMES) was added as a hydrophobizing agent in a weight ratio of 1.2 (9.32 g) compared to Comparative Example 1.

Comparative Example 6

1.30 mol of ethanol and 0.02 g of a HCl acid catalyst were added to a reactor and mixed, and then 0.62 mol of hexamethyldisilazane (HMDS) was added thereto and mixed. Thereafter, the mixture was subject to reflux at 100° C. for 1 hour, and the generation of ammonia ($NH_3$) gas was confirmed. 1 hour after the reflux, the reaction solution (a catalyst composition) was collected, and then added to a pre-hydrolyzed TEOS(HTEOS) ethanol solution (silica content=20 wt %) and mixed to prepare a silica sol. At this time, the reaction solution is a solution composed of HMDS, trimethylethoxysilane (TMES), which is a reaction product of the ethanol and the acid catalyst, a gaseous ammonia ($NH_3$), and ethanol. The silica sol was impregnated into a fiber (a glass fiber fiber mat, 10 mm) which is a substrate for a blanket. A fiber composite impregnated with the silica sol was left to stand at room temperature for 24 hours to be subjected to gelation. Thereafter, aging was performed on the fiber composite in a 70° C. oven for 4 hours, and a silica wet gel blanket manufactured thereby was placed in a 7.2 L supercritical extractor and $CO_2$ was injected thereto. Thereafter, the temperature inside the extractor was raised to 70° C. over the course of 1 hour and 20 minutes, and when 70° C. and 150 bar were reached, a cycle of injecting and discharging $CO_2$ at a rate of 0.5 L/min for 20 minutes and keeping the $CO_2$ injection stopped for 20 minutes was repeated for 4 times. At the time of injecting and discharging $CO_2$, ethanol was recovered through a lower end of the extractor. Thereafter, $CO_2$ was vented over the course of 2 hours. After supercritical drying was completed, drying was performed for 1 hour under the conditions of 150° C. and atmospheric pressure to manufacture a silica aerogel blanket.

Comparative Example 7

A silica aerogel blanket was manufactured in the same manner as in Comparative Example 6 except that when preparing a silica sol in Comparative Example 6, the addition amount of hexamethyldisilazane(HMDS) was adjusted to allow trimethylethoxysilane (TMES) in a reaction solution to have a weight ratio of 0.8 compared to Comparative Example 6.

Comparative Example 8

A silica aerogel blanket was manufactured in the same manner as in Comparative Example 6 except that when preparing a silica sol in Comparative Example 6, the addition amount of hexamethyldisilazane(HMDS) was adjusted to allow trimethylethoxysilane (TMES) in a reaction solution to have a weight ratio of 0.9 compared to Comparative Example 6.

Comparative Example 9

A silica aerogel blanket was manufactured in the same manner as in Comparative Example 6 except that when preparing a silica sol in Comparative Example 6, the addition amount of hexamethyldisilazane(HMDS) was adjusted to allow trimethylethoxysilane (TMES) in a reaction solution to have a weight ratio of 1.1 compared to Comparative Example 6.

Comparative Example 10

A silica aerogel blanket was manufactured in the same manner as in Comparative Example 6 except that when preparing a silica sol in Comparative Example 6, the addition amount of hexamethyldisilazane(HMDS) was adjusted to allow trimethylethoxysilane (TMES) in a reaction solution to have a weight ratio of 1.2 compared to Comparative Example 6.

Experimental Example

For the aerogel blanket manufactured in each of Examples 1 to 5 and Comparative Examples 1 to 10, the average aerogel structure size, flexural modulus, compression strength, tensile strength, room temperature (23±5° C.) thermal conductivity, and moisture impregnation rate were measured, and are shown in Tables 1 to 3.

Figure 2:
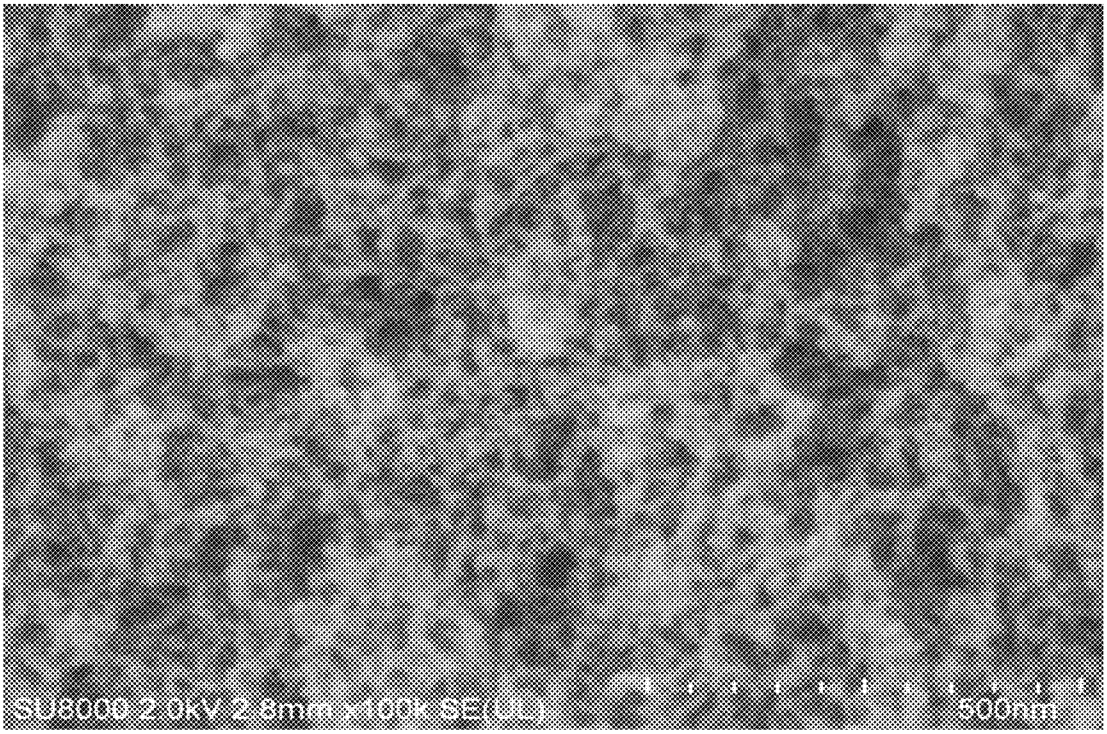
FIG. 2 is a photograph taken by a scanning electron microscope (SEM) of the cross-section of a silica aerogel blanket manufactured in Comparative Example 1 of the present invention.

In addition, an image of the cross-section of the aerogel blanket manufactured in each of Example 1 and Comparative Example 1 was taken with a scanning electron microscope (SEM), and is shown in FIGS. 1 and 2, respectively.

Average aerogel structure size ($D_{50}$, μm) : 10 ml of dry powder of an aerogel structure formed on a substrate for a blanket of an aerogel blanket was sprayed into a particle size analyzer S3500 of Microtrac Co., Ltd with air at a pressure of 15 psi, and using laser diffraction of 780 nm wavelength, the average aerogel structure size was measured for 10 seconds to 30 seconds.

Flexural modulus (Mpa): An aerogel blanket was prepared as a specimen according to the ASTM D790 standard, and using UTM(UT-005E) of MTDI Co., Ltd, the flexural modulus of the aerogel blanket was measured in accordance with ASTM D790. Specifically, through the 3-point bending analysis method, the prepared specimen was placed on a support, and force was applied to the center of the specimen at a rate of 1 mm/min to 10 mm/min. Then, a load at the time of fracture of the specimen was recorded, and an initial slope value was measured by dividing the load by 15% strain to measure a flexural modulus at the 15% strain. The lower the flexural modulus, the better the flexibility of the aerogel blanket.

Compression strength (kPa): An aerogel blanket was prepared as a specimen according to the ASTM C165 standard, and using UTM (UT-005E) of MTDI Co., Ltd, the compression strength of the aerogel blanket was measured in accordance with ASTM C165. Specifically, jigs for compression were installed and a specimen was inserted between the jigs, and then compression force was applied from above at a rate of 1 mm/min to 10 mm/min to transmit the force from above to the specimen, and the value of a load applied to the specimen was measured to measure a compression strength at 10% strain. The higher the compression strength, the better the durability for the mechanical strength the aerogel blanket.

Tensile strength ($N/cm^2$): An aerogel blanket was prepared as a specimen according to the ASTM D638 standard, and using UTM (UT-005E) of MTDI Co., Ltd, the tensile strength of the aerogel blanket was measured in accordance with ASTM D638. Specifically, jigs for tensile were installed at both ends of a specimen, and tensile force was applied at a rate of 1 mm/min to 500 mm/min to measure a value obtained by dividing force applied until the specimen was tensioned and fractured by the cross-sectional area of the specimen before being tensile-deformed to measure the tensile strength. If the tensile strength is too high, the flexibility of an aerogel blanket is degraded, and if too low, the strength is degraded, so that the tensile strength needs to be maintained at 40 $N/cm^2$ to 60 $N/cm^2$.

Room temperature (23±5° C.) thermal conductivity (mW/mK): An aerogel blanket was cut to a length of 125 mm to 150 mm, a width of 125 mm to 150 mm, a thickness of 8 mm to 12 mm to prepare a specimen, and using the HFM 436 Lambda equipment of NETZSCH Co., Ltd, the room temperature (23±5° C.) thermal conductivity was measured. The lower the room temperature thermal conductivity, the better then thermal insulation.

Moisture impregnation rate (wt %): A specimen having a length of 100 mm, a width of 100 m m, a thickness of 8 mm to 12 mm was floated on distilled water of 21±2° C., and a 6.4 mm mesh screen was placed on the specimen to impregnate the specimen by sinking the same to 127 mm below the sur face of the water. 15 minutes later, the mesh screen was removed, and when the specimen rose to the surface, the specimen was picked up with a clamp and was hung vertically for 60±5 seconds. Thereof ter, the weight before and after the impregnation were each measured to determine a weight increase r ate, and using Equation 3.1 below, the moisture impregnation rate of 15 minutes was calculated. The lower the moisture impregnation rate, the better the thermal insulation durability according to water repellency.

Moisture impregnation rate of 15 minutes (wt %)={(Aerogel blanket weight after impregnation in distilled water of 21±2° C. for 15 minutes−Aerogel blanket weight before impregnation in distilled water)/Aerogel blanket weight before impregnation in distilled water}×100 [Equation 1]

TABLE 1

| Classification | | Examples | | | | |
|---|---|---|---|---|---|---|
| | | 1 | 2 | 3 | 4 | 5 |
| Average aerogel structure size ($D_{50}$) | (μm) | 6.3 | 6.5 | 6.8 | 5.8 | 5.9 |
| Flexural modulus | (MPa) | 0.041 | 0.065 | 0.044 | 0.033 | 0.023 |
| Compression strength | (kPa) | 36 | 36 | 35 | 35 | 39 |
| Tensile strength | ($N/cm^2$) | 53 | 44 | 51 | 45 | 47 |
| Room temperature (23 ± 5° C.) thermal conductivity | (mW/mK) | 18.82 | 16.99 | 17.48 | 16.16 | 17.43 |
| Moisture impregnation rate | (wt %) | 1.81 | 2.22 | 1.93 | 1.73 | 1.51 |

TABLE 2

| Classification | | Comparative Examples | | | | |
|---|---|---|---|---|---|---|
| | | 1 | 2 | 3 | 4 | 5 |
| Average aerogel structure size ($D_{50}$) | (μm) | 16.2 | 19.4 | 19.1 | 17.5 | 15.5 |
| Flexural modulus | (MPa) | 0.095 | 0.085 | 0.088 | 0.111 | 0.091 |
| Compression strength | (kPa) | 38 | 40 | 36 | 37 | 35 |

TABLE 2-continued

| Classification | | Comparative Examples 1 | 2 | 3 | 4 | 5 |
|---|---|---|---|---|---|---|
| Tensile strength | ($N/cm^2$) | 48 | 49 | 43 | 50 | 45 |
| Room temperature (23 ± 5° C.) thermal conductivity | (mW/mK) | 17.88 | 17.56 | 18.11 | 18.33 | 17.17 |
| Moisture impregnation rate | (wt %) | 2.25 | 2.45 | 2.75 | 2.15 | 1.88 |

TABLE 3

| Classification | | Comparative Examples 6 | 7 | 8 | 9 | 10 |
|---|---|---|---|---|---|---|
| Average aerogel structure size ($D_{50}$) | (μm) | 18.8 | 15.2 | 16.6 | 19.3 | 17.7 |
| Flexural modulus | (MPa) | 0.095 | 0.079 | 0.101 | 0.099 | 0.085 |
| Compression strength | (kPa) | 36 | 37 | 35 | 40 | 38 |
| Tensile strength | ($N/cm^2$) | 47 | 46 | 51 | 50 | 44 |
| Room temperature (23 ± 5° C.) thermal conductivity | (mW/mK) | 17.77 | 18.88 | 18.55 | 19.13 | 18.15 |
| Moisture impregnation rate | (wt %) | 2.45 | 3.25 | 3.11 | 2.78 | 2.22 |

As shown in Tables 1 to 3, the aerogel blanket of each of Examples 1 to 5 manufactured according to the present invention satisfied an aerogel structure size of 5 μm to 10 μm, and thus, was confirmed to have a decreased flexural modulus compared to the aerogel blanket of each of Comparative Examples 1 to 10. On the other hand, the aerogel blanket of each of Comparative Examples 1 to 10 had an aerogel structure size of 15 μm to 20 μm, and thus, was confirmed to have a high flexural modulus. From the above, the aerogel blanket according to the present invention was confirmed to have excellent flexibility, and thus, have excellent processability.

In addition, while having a decreased flexural modulus compared to Comparative Examples 1 to 10, the aerogel blanket according to the present invention was confirmed to have maintained the same level of mechanical physical properties such as compression strength and tensile strength, room temperature thermal conductivity, and moisture impregnation rate as the aerogel blanket of each thereof.

Particularly, as shown in FIG. 1, in the aerogel blanket of Example 1 manufactured according to the present invention, it was confirmed that the aerogel structure was affected by the hydrophobizing agent during the gelation reaction, so that the reaction was terminated before the size of the aerogel structure increased, or the growth of the aerogel structure was inhibited, so that an aerogel structure in the shape of a spider web entangled like a skein was prepared. On the other hand, as shown in FIG. 2, in the aerogel blanket of Comparative Example 1, it was confirmed that the aerogel structure was not affected by the hydrophobizing agent during the gelation reaction, and thus aerogel structures were tangled together, so that an aerogel structure in the shape of one large plate was prepared.

From the above results, the aerogel blanket according to the present invention was confirmed to be able to improve processability and workability by having excellent flexibility due to a low flexural modulus thereof, while having excellent mechanical physical properties, thermal insulation, and durability.

The invention claimed is:

1. An aerogel blanket comprising:

an aerogel structure; and a substrate for a blanket, wherein:

the aerogel structure includes a three-dimensional network structure formed by a plurality of aerogel particles aggregated or bonded;

an average aerogel structure size ($D_{50}$) measured by spraying 10 ml of dry powder of the aerogel structure with air at a pressure of 15 psi, and using laser diffraction of 780 nm wavelength is 5 μm to 10 μm;

the aerogel structure is formed by a process including gelling a silica sol that includes a silica precursor composition and a catalyst composition;

the catalyst composition includes a hydrophobizing agent and water; and the hydrophobizing agent includes trimethylethoxy silane (TMES).

2. The aerogel blanket of claim 1, wherein the aerogel structure has a spider web shape having a three-dimensional network structure formed by a plurality of aerogel particles aggregated or bonded, wherein the spider web shape is a structure having a network of aerogel filaments interconnected to one another.

3. The aerogel blanket of claim 2, wherein:

the average aerogel structure size ($D_{50}$) is 6 μm to 7 μm, the aerogel particles comprise a hydrophobic group on the surface of the inside of the aerogel particles, the aerogel blanket has a flexural modulus of 0.08 MPa or less at 15% strain measured in accordance with ASTM D790, the aerogel blanket has a compression strength of 30 kPa to 50 kPa at 10% strain measured in accordance with ASTM C165, the aerogel blanket has a tensile strength of 40 $N/cm^2$ to 60 $N/cm^2$ measured in accordance with ASTM D638, and the aerogel blanket has a moisture impregnation rate of 15 minutes of 20.0 wt % or less, which is calculated by Equation 1 below:

Moisture impregnation rate of 15 minutes (wt %)={(Aerogel blanket weight after impregnation in distilled water of 21±2° C. for 15 minutes-Aerogel blanket weight before impregnation in distilled water)/Aerogel blanket weight before impregnation in distilled water}×100. [Equation 1]

4. The aerogel blanket of claim 1, wherein the average aerogel structure size ($D_{50}$) is 6 μm to 7 μm.

5. The aerogel blanket of claim 1, wherein the aerogel blanket has the aerogel structure formed inside and on the surface of the substrate for a blanket.

6. The aerogel blanket of claim 1, wherein the aerogel particles comprise a hydrophobic group on the surface of the inside of the aerogel particles.

7. The aerogel blanket of claim 1, wherein the aerogel blanket has a flexural modulus of 0.08 MPa or less at 15% strain measured in accordance with ASTM D790.

8. The aerogel blanket of claim 1, wherein the aerogel blanket has a flexural modulus of 0.023 MPa to 0.065 MPa at 15% strain measured in accordance with ASTM D790.

9. The aerogel blanket of claim 1, wherein the aerogel blanket has a compression strength of 30 kPa to 50 kPa at 10% strain measured in accordance with ASTM C165.

10. The aerogel blanket of claim 1, wherein the aerogel blanket has a compression strength of 35 kPa to 40 kPa at 10% strain measured in accordance with ASTM C165.

11. The aerogel blanket of claim 1, wherein the aerogel blanket has a tensile strength of 40 $N/cm^2$ to 60 $N/cm^2$ measured in accordance with ASTM D638.

12. The aerogel blanket of claim 1, wherein the aerogel blanket has a tensile strength of 44 $N/cm^2$ to 53 $N/cm^2$ measured in accordance with ASTM D638.

13. The aerogel blanket of claim 1, wherein the aerogel blanket has a room temperature (23=5° C.) thermal conductivity of 30.0 mW/mK or less.

14. The aerogel blanket of claim 1, wherein the aerogel blanket has a moisture impregnation rate of 15 minutes of 20.0 wt % or less, which is calculated by Equation 1 below:

Moisture impregnation rate of 15 minutes (wt %)={(Aerogel blanket weight after impregnation in distilled water of 21±2° C. for 15 minutes-Aerogel blanket weight before impregnation in distilled water)/Aerogel blanket weight before impregnation in distilled water}×100. [Equation 1]

15. The aerogel blanket of claim 1, wherein the hydrophobizing agent is activated before mixing the catalyst composition with the silica precursor composition.

16. The aerogel blanket of claim 15, wherein:

the aerogel blanket has a flexural modulus of 0.023 MPa to 0.065 MPa at 15% strain measured in accordance with ASTM D790, the aerogel blanket has a compression strength of 35 kPa to 40 kPa at 10% strain measured in accordance with ASTM C165, the aerogel blanket has a tensile strength of 44 $N/cm^2$ to 53 $N/cm^2$ measured in accordance with ASTM D638, and the aerogel blanket has a room temperature (23+5° C.) thermal conductivity of 30.0 mW/mK or less.

* * * * *